United States Patent [19]

Knoch et al.

[11] Patent Number: 4,661,740

[45] Date of Patent: Apr. 28, 1987

[54] POLYCRYSTALLINE SINTERED BODIES BASED ON LANTHANUM HEXABORIDE, AND A PROCESS FOR THEIR MANUFACTURE

[75] Inventors: Heinrich Knoch, Waltenhofen-Lanzen; Eckhart Bechler, Kempten; Alfred Lipp, Bad Worishofen, all of Fed. Rep. of Germany

[73] Assignee: Elektroschmelzwerk Kempten GmbH, Kempten, Fed. Rep. of Germany

[21] Appl. No.: 854,044

[22] Filed: Apr. 21, 1986

[30] Foreign Application Priority Data

May 10, 1985 [DE]  Fed. Rep. of Germany ....... 3516955

[51] Int. Cl.$^4$ .......................... A47B 88/00; H01B 1/06
[52] U.S. Cl. ................................ 313/346 R; 252/502; 252/509; 252/516; 252/521
[58] Field of Search ............... 252/502, 504, 516, 506, 252/509, 521; 419/11, 14, 17, 38, 39, 48, 56, 57; 29/25.11, 25.17; 501/90, 123; 313/346 R, 336, 346 DC

[56] References Cited

U.S. PATENT DOCUMENTS 4,482,839  11/1984  Wada et al. ..................... 313/346 R

*Primary Examiner*—Josephine L. Barr
*Attorney, Agent, or Firm*—Burgess, Ryan & Wayne

[57] ABSTRACT

The invention is a polycrystalline sintered body based on lanthanum hexaboride and having a density of at least 95% of the theoretical density. The sintered body comprises lanthanum hexaboride, boron carbide and amorphous carbon, the content of $B_4C+C$ being from 0.1 to 10% by weight and the total amount of $La+B+C$ being at least 99.0% by weight, in each case calculated on the total weight. The sintered bodies have a homogeneous microstructure with mean grain sizes $< 10\ \mu m$, in which, in addition to the crystalline lanthanum hexaboride phase, boron carbide and carbon are detectable as separate, finely divided phases.

The sintered bodies can be manufactured by pressureless sintering at temperatures of from 2150° to 2200° C. from powder mixtures comprising lanthanum hexaboride and, in addition, mixtures of a carbon-containing material and a boron component.

12 Claims, No Drawings

POLYCRYSTALLINE SINTERED BODIES BASED ON LANTHANUM HEXABORIDE, AND A PROCESS FOR THEIR MANUFACTURE

Lanthanum hexaboride, because of its good thermal emission properties, is especially important as a material for emission cathodes in high power devices. Because of rapid developments in the field of electronic engineering, there is an increasing demand for dense shaped bodies based on lanthanum hexaboride.

Dense shaped bodies can usually be manufactured by the so-called hot-press process. In the case of lanthanum hexaboride, however, impurities produced as a result of reaction with the carbon from the graphite compression molds used for this purpose cannot be eliminated. In addition, the carbon compounds formed are moisture-sensitive and cause the lanthanum hexaboride shaped bodies manufactured by hot-pressing to become brittle.

BACKGROUND OF THE INVENTION

To avoid these difficulties, the use of a pressureless sintering technique for the manufacture of self-bonded lanthanum hexaboride shaped bodies was investigated by Russian authors at the end of the 1960's. A summary of the results obtained is given by H. Pastor in the book "Boron and Refractory Borides", Ed. V. I. Matkovich, Springer-Verlag Berlin-Heidelberg-New York 1977, pages 463 to 466. As can be seen from the book, densities of up to 82% of the theoretical density (noted as % TD herein) were achieved when using relatively coarse-grained lanthanum hexaboride powders (particle sizes in the range of from <2.8 μm to >6.4 μm) by sintering small sample in vacuo at 2400° C. However considerable grain growth occurred (250 to 300 μm) and there were substantial weight losses due to evaporation (up to 15% by weight). Embedding the samples to be sintered in lanthanum hexaboride powder made it possible to reduce the weight losses (<5% by weight).

When very fine lanthanum hexaboride power (particle sizes 1 μm) were used, densities close to the theoretical value were achieved by sintering under argon at from 2000° to 2450° C. or under hydrogen at from 1800° to 2200° C. However, the greatest grain growth occurred when sintering under hydrogen. For example, the following grain sizes were formed in the finished sintered body after 2 hours' sintering at 2200° C.: 20 to 25 μm in vacuo, 60 um under argon and 150 μm under $H_2$. Moreover, it was demonstrated that, when using commercial lanthanum hexaboride powders, high density is difficult to achieve in the sintering process because the impurities evaporate.

Self-bonded lanthanum hexaboride shaped bodies, manufactured by pressureless sintering, were consequently either not sufficiently dense or had an irregular density distribution. In addition the high weight losses occurring during the sintering process could be reduced but not eliminated by embedding in lanthanum hexaboride powder. By using a mixture of lanthanum hexaboride powder and granules as the embedding material, it should at least be possible to prevent the embedding material and the sintered body from sticking together.

However, since it is known that porosity or irregular density distribution impairs the thermoemissive properties of lanthanum hexaboride, attempts have been made to improve the sintering behavior of $LaB_6$ powders by adding small quantities of nickel or iridium. However, the rate of evaporation under the conditions of use is increased by the nickel boride that is present in the shaped body.

Ceramic mixed materials of boron carbide that contain from 10 to 70% by volume of lanthanum hexaboride and can be manufactured by pressureless sintering of the powder mixtures at 2040° C. have also been used as a cathode material. However, since the emmisivity of these mixed materials is linearly dependent on the $LaB_6$ content, the high radiation power of pure $LaB_6$ cannot be fully utilised (see U.S. Pat. No. 4,265,66).

In Inst. of Mat. Science, Acad. of Sciences of the Ukr. SSR, translated from Poroshkovaya Metallurgiya 220 (1981), pp. 56–60, Yu. B. Paderno et al. draw attention to the decomposition of sintered shaped bodies of $LaB_6$ caused by the use of commercially pure lanthanum hexaboride powders for the manufacture of these shaped bodies. Because of the impurities contained in these powders or formed therefrom during sintering at from 1800° to 1900° C., the sintered bodies contain foreign phases which readily hydrolyse on storage at room temperature. These foreign phases are believed to be carbon-containing lanthanum compounds, such as lanthanum carbides and lanthanum borocarbides, or oxygen-containing compounds, such as lanthanum oxides, boron oxides and borates. Boron oxides and lanthanum oxides have been detected in sintered shaped bodies prepared from commercially available lanthanum hexaboride by x-ray diffraction analysis. Due to the hygroscopic nature of boron oxides and lanthanum oxides, sintered shaped bodies containing these materials break and disintegrate when stored at room temperature.

According to the known processes, it was not possible to manufacture polycrystalline sintered bodies having a high $LaB_6$ content that have both high density, that is a low porosity, and also a uniform fine-grained microstructure and are free from foreign phases that impair the storage-stability of the sintered bodies at room temperature or increase the rate of evaporation under the conditions of use as a cathode material.

It is therefore interesting from a commercial perspective to provide shaped bodies having a high density and uniform fine-grained microstructure manufactured by a simple pressureless sintering process without having to be embedded in a lanthanum hexaboride powder material, and can use commercially pure lanthanum hexaboride powder as the starting material.

BRIEF SUMMARY OF THE INVENTION

According to the invention, polycrystalline sintered bodies based on lanthanum hexaboride having a density of at least 95% TP, comprising lanthanum hexaboride, boron carbide and amorphous carbon, the content of $B_4C+C$ being from 0.1 to 10% by weight and the total amount of $La+B+C$ being at least 99.0% by weight, in each case calculated on the total weight, are provided. The sintered bodies having a homogeneous microstructure with a mean grain size of <10 μm, in which, in addition to the crystalline lanthanum hexaboride phase, boron carbide and carbon, are detectable as separate, finely divided phases.

The sintered bodies according to the invention are manufactured by pressureless sintering at temperatures of from 2150° to 2200° C. from powder mixtures comprising lanthanum hexaboride and mixtures of a carbon-containing material and a boron component.

DETAILED DESCRIPTION OF THE INVENTION

Relatively fine-grained lanthanum hexaboride powders having maximum particle sizes of 3 μm and finer are preferably used as the starting material for the powder mixtures. The purity of the lanthanum hexaboride powders is not critical since both highly pure powders and powders of commercial-grade purity can be used. The process is very economical, for mass production, since expensive processes for purifying the powders are not necessary.

As the carbon-containing material carbon per se can be used, for example, particulate carbon black such as acetylene black, having a specific surface area in the range of from 10 to 400 m$^2$/g (measured according to BET) is useful. Preferably, however, an organic material that can be coked at temperatures of up to approximately 1000° C. is used to provide the carbon. Particularly useful materials include phenoplasts, coal tar pitch and phenol formaldehyde condensation products of the novolak and resol type, which materials decompose in the range of from about 100° to 900° C. with the formation of amorphous carbon in a yield of from about 35 to about 50%.

Amorphous boron, boron carbide or mixtures thereof can be used as the boron component, amorphous boron having proved particularly suitable.

The quantities of carbon-containing materials and boron component are such that they are present in approximately equal quantities by weight, calculated as free carbon and as free boron, the range in each case of from about 0.25 to 5% by weight, calculated on the weight of lanthanum hexaboride powder. The excess of carbon, which can be up to three times the carbon content in an equivalent amount of boron carbide, makes it possible to use as the starting material, without additional purification, lanthanum hexaboride powders which, as a result of grinding to the required particle size of 3 μm and finer, can have an oxygen content of up to approximately 5% by weight.

According to the invention, sintered bodies are produced by pressureless sintering. In the process, the starting materials are mixed homogeneously and the mixture of the materials is preformed to produce green bodies. For preparing the homogeneous mixture, the carbon additive, when in the form of organic material, can be dissolved in a solvent and the mixture of lanthanum hexaboride powder and the boron component can be dispersed in the solution. When free carbon per se is used, the lanthanum hexaboride and the boron component, together with the elemental carbon, are dispersed in a solution of a temporary binder and/or lubricant. Useful organic solvents include, acetone and lower aliphatic alcohols having from 1 to 6 C atoms. Dispersion can be carried out by stirring a low-viscosity suspension mechanically in a plastic container or by kneading a viscous suspension in a kneading apparatus. The solvent is then removed, for example, in the case of a low-viscosity suspension, by spray drying or, in the case of a viscous suspension, by evaporation during the kneading process.

The homogeneous mixture is then shaped to form a green body. Shaping can be effected by known measures which include; pressing or isostatic pressing at room temperature or at elevated temperature, a pressure of from 30 to 600 MPa, preferably from 100 to 500 MPa, being usually employed. After shaping, the green bodies preferably have a theoretical density (% TD) of at least 50%, more preferably at least 60%, calculated on the theoretical density of the mixture.

The preformed green bodies are then heated to temperatures of from 2150° to 2200° C. in any desired type of sintering furnace in vacuo or in the presence of an inert gas atmosphere under a pressure of up to about 0.1 MPa. The dwell time at these temperatures depends primarily on the size of the shaped bodies to be sintered. Dwell times of from about 5 to about 60 minutes are generally sufficient. Temperatures of 2200° C. should not be exceeded if excessive grain growth is to be avoided. When the carbon is used in the form of an organic material, the organic material is coked during the heating process so that the carbon is in the free form at the start of the actual sintering process.

A noble gas atmosphere such as argon, has proved useful as the inert gas atmosphere. Pressure is to be understood here as being normal pressure which is usually of the order of about 0.1 MPa.

Under the above-mentioned conditions, when mixtures of carbon and amorphous boron in equal quantities by weight are used, preferably of from 2 to 4% by weight in each case, calculated on the amount of lanthanum hexaboride powder employed, sintered densities of >95% TD and preferably >98% TD, are achieved.

In addition to lanthanum hexaboride, boron carbide and free carbon are also detected analytically in the sintered bodies manufactured in this manner. The sintered bodies are stable and are not sensitive to atmospheric moisture. Even when lanthanum hexaboride starting powders of commercial-grade purity are used that is, powders having an oxygen content of more than 1% by weight, phases sensitive to hydrolysis are apparently not formed. The phases sensitive to hydrolysis have generally been regarded as causing the decomposition of the sintered lanthanum hexaboride shaped bodies when lanthanum hexaboride powders containing substantial amounts of oxygen were used to form the sintered bodies without the addition of carbon and boron to promote sintering.

Likewise, when pressureless sintering is carried out under the conditions of the present process, with the addition of carbon and boron to promote sintering, virtually no lanthanum hexaboride weight losses are observed, even where sintering is carried out in vacuo without embedding the body in lanthanum hexaboride powder during the sintering.

The sintered bodies according to the invention have a homogeneous microstructure with mean grain sizes of <10 μm that is, only slight grain growth takes place during the sintering process.

The invention will be explained in more detail with reference to the following embodiment which is presented by way of exemplification and not limitation.

EXAMPLE

The starting material was a lanthanum hexaboride powder having the following composition
La 67.1% by weight
B 31.4% by weight
O 1.32% by weight
C 0.03% by weight
and a particle size of 3 μm and finer. The powder was obtained by grinding a powder manufactured from $La_2O_3$ and $B_4C$ by the boron carbide process. The carbon-containing additive was a commercial pulverulent phenol formaldehyde resin of the novolak type and the boron component was amorphous boron.

The lanthanum hexaboride powder was mixed with 3% by weight of boron and a solution of the novolak powder in methanol in a quantity corresponding to approximately 3% by weight of free carbon, and the liquid paste was kneaded in the presence of air until virtually all the solvent had evaporated. The powder mixture was then pressed in a steel mold under a pressure of 100 MPa to form green bodies having a diameter of 10 mm and a height of 15 mm. The green bodies, standing on graphite supports, were heated at the rate of approximately 10° C. per minute to 2180° C. in an inductively heated graphite furnace under a vacuum of approximately 133 Pa. The bodies were kept at this temperature for 20 minutes.

The sintered bodies manufactured in this manner had a density of 4.38 g/cm$^3$. The micrograph showed a substantially non-porous, homogeneous, fine-grain structure with grain sizes clearly less than 10 $\mu$m.

Chemical analysis of the sintered body gave the following values:

La 62.8% by weight
B 33.3% by weight
$C_{total}$ 3.65% by weight, of which $C_{free}$ was 2.55% by weight
O 0.079% by weight The sum of La+B+C is 99.75% by weight.

Assuming that the difference $C_{total} - C_{free}$ is in the form of carbon that is bonded to $B_4C$, the $B_4C$ content is 5.06% by weight. The $LaB_6$ content is 92.14% by weight, with a B/La ratio of 6.0.

The theoretical density of the mixture can be calculated by the formula $$TD = \frac{100}{\frac{\% \text{ by weight } LaB_6}{\text{Density } LaB_6} + \frac{\% \text{ by weight } B_4C}{\text{Density } B_4C} + \frac{\% \text{ by weight } C}{\text{Density } C}}$$

If the following densities are assumed: $LaB_6$ 4.72 g/cm$^3$, $B_4C$ 2.51 g/cm$^3$, C 2.25 g/cm$^3$, then the theoretical density is found to be $$TD = \frac{100}{\frac{92.14}{4.72} + \frac{5.06}{2.51} + \frac{2.55}{2.25}} = 4.41 \text{ g/cm}^3.$$

The measured sintered density of 4.38 g/cm$^3$ therefore corresponds to 99.3% TD.

The sintered bodies have a deep violet-blue color and are stable in moist air and in water.

We claim:

1. Polycrystalline sintered bodies based on lanthanum hexaboride having a density of at least 95% of the theoretical density, comprising lanthanum hexaboride, boron carbide and amorphous carbon and having a content of boron carbide+carbon of from 0.1 to 10% by weight, a total amount of La+B+C of at least 99.0% by weight, in each case calculated on the total weight, and a homogeneous microstructure with a mean grain size of <10 $\mu$m and wherein, in addition to the crystalline lanthanum hexaboride phase, boron carbide and carbon are detectable as separate, finely divided phases.

2. A process for manufacturing a polycrystalline sintered body of claim 1 which comprises:
    forming a mixture comprising lanthanum hexaboride, a carbon containing material and a boron component; shaping the mixture to form a green body having a density of at least 50% TD and heating the green body at a temperature in the range of from about 2150° C. to about 2200° C. in vacuo or in the presence of an inert gas at a pressure of up to about 0.1 MPa.

3. The process of claim 2 wherein the lanthanum hexaboride powder has a maximum particle size of 3 $\mu$m.

4. The process of claim 2 wherein the carbon containing material comprises at least one member selected from the group consisting of particulate carbon, phenoplasts, coal tar pitch, a novolak phenol formaldehyde condensation product and a resol phenol formaldehyde condensation product.

5. The process of claim 2 wherein the boron component comprises at least one member selected from the group consisting of amorphous boron and boron carbide.

6. The process of claim 4 wherein the boron component comprises at least one member selected from the group consisting of amorphous boron and boron carbide.

7. The process of claim 4 wherein the carbon containing material comprises a phenol formaldehyde condensation product.

8. The process of claim 7 wherein the boron component comprises amorphous boron.

9. The process of claim 2 wherein the carbon containing material and the boron component are each used in an amount sufficient to provide from about 0.25 to 5% by weight, calculated as free carbon and free boron, based on the weight of lanthanium hexaboride powder.

10. The process of claim 9 wherein the lanthanum hexaboride powder has an oxygen content of up to about 5% by weight.

11. The process of claim 10 wherein the amount of the cabon containing material and boron component are sufficient to provide about an equal amount by weight of carbon and boron calculated as free carbon and free boron.

12. A cathode comprising the sintered body of claim 1.

* * * * *